United States Patent [19]

Fox et al.

[11] Patent Number: 5,163,361
[45] Date of Patent: Nov. 17, 1992

[54] PNEUMATIC VARIABLE CAPACITY FUMIGATION SYSTEM

[75] Inventors: Seth F. Fox; Charles L. Estes; Donald F. Fox, all of Leavenworth, Kans.

[73] Assignee: Midland Fumigant Company, Inc., Leavenworth, Kans.

[21] Appl. No.: 850,961

[22] Filed: Mar. 12, 1992

[51] Int. Cl.$^5$ .................. A23B 7/00; A23L 3/34
[52] U.S. Cl. .................... 99/476; 99/467; 99/474; 99/482; 99/494; 422/28; 422/32
[58] Field of Search ............... 99/467, 474, 475, 476, 99/482, 516, 517, 646 R; 426/310, 320, 335; 422/28, 32

[56] References Cited

U.S. PATENT DOCUMENTS

| | | | |
|---|---|---|---|
| 856,354 | 6/1907 | Martin et al. | 99/476 |
| 3,939,287 | 2/1976 | Orwig et al. | 99/516 |
| 4,059,048 | 11/1977 | Dickson | 426/320 |
| 4,078,480 | 3/1978 | Luck | 99/476 |
| 4,509,682 | 4/1985 | Heiman et al. | 99/467 |
| 4,641,573 | 2/1987 | Gunn | 99/494 |
| 4,729,298 | 3/1988 | Dornemann | 99/474 |
| 4,735,134 | 4/1988 | Brower | 99/516 |
| 4,759,277 | 7/1988 | Fleck | 99/482 |
| 4,779,524 | 10/1988 | Wade | 99/476 |
| 4,977,825 | 12/1990 | Morgan | 99/476 |

Primary Examiner—Timothy F. Simone
Attorney, Agent, or Firm—Chase & Yakimo

[57] ABSTRACT

A recirculating fumigation system for facilities that store agricultural products employs a blower which is chemically inert to the gaseous fumigant, driven by a variable speed pneumatic motor which provides the system with adjustable capacity over a range of recirculation blower speeds and the capability of high speed operation for degasation. In ship holds the system may be mounted in the manway of the hatch of the cargo hold. The system is entirely nonelectrical and isolated from the gaseous fumigant as the pneumatic motor is driven by a separate air supply.

9 Claims, 3 Drawing Sheets fig.2
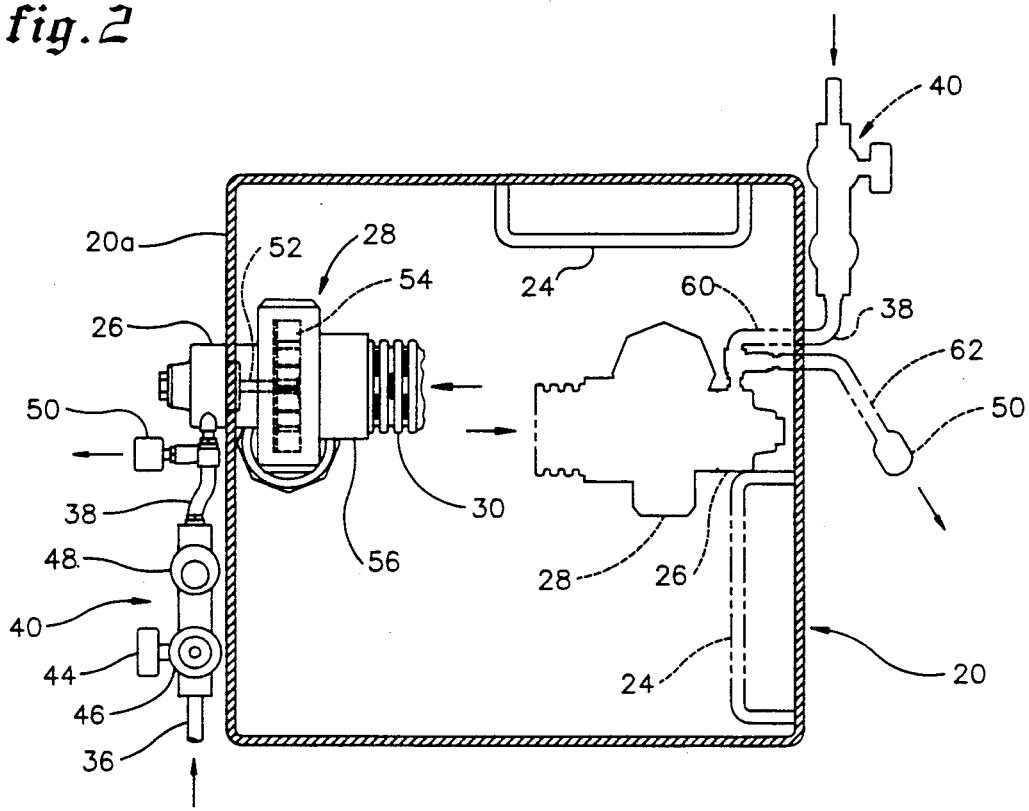
fig.3
fig.4
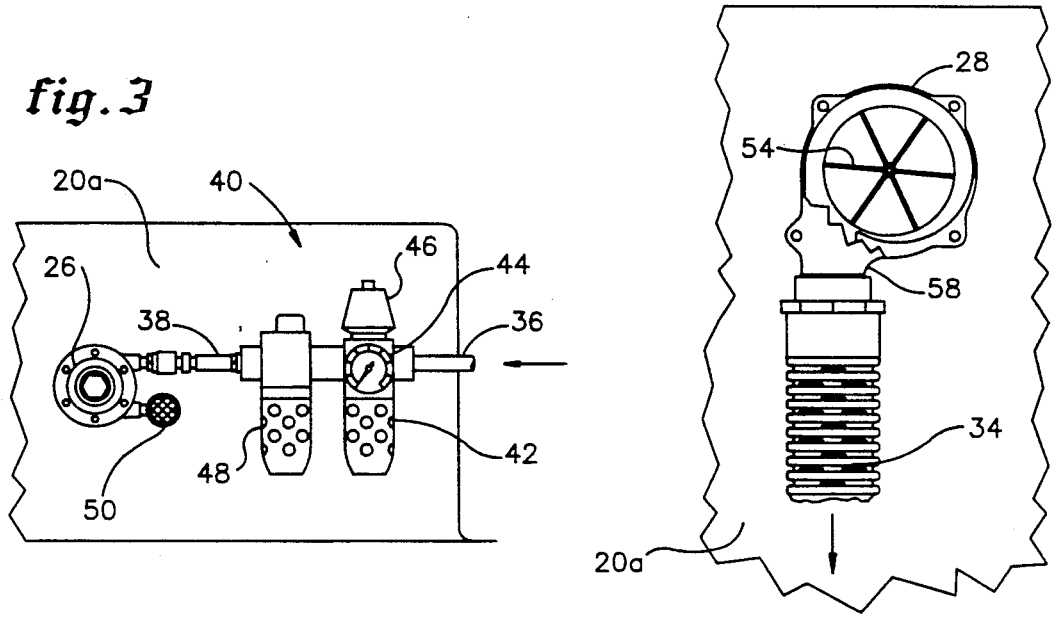

PNEUMATIC VARIABLE CAPACITY FUMIGATION SYSTEM

This invention relates to improvements in recirculating fumigation systems for facilities such as grain elevators and ship holds in which agricultural products are stored for a period of time and, in particular, to such a system that maximizes safety and flexibility and provides a variable speed capability for both recirculation and degasation.

Agricultural products such as grain are commonly stored for a period of time after harvest until processing and may also be stored in transit for export to other countries. Fumigation of the stored product is required to eradicate pests and protect the product until it is processed. Gaseous fumigants have been used for many years for this purpose, and in recent years phosphine gas evolved from aluminum phosphide pellets has enjoyed wide use in both fixed storage facilities and in the fumigation of ship holds. Typically, the pellets are emplaced in the stored product and a recirculation system is employed to assure that the phosphine gas in an effective concentration reaches all portions of the mass of the stored product irrespective of the distance from the phosphine source.

Recirculation systems commonly employed heretofore utilize a small fan or blower powered by an electric motor and provided with supply and return lines in communication with the interior of the storage container. The supply line may extend throughout the bottom of the container, and is perforated so that the gas-containing air under pressure is introduced to the product. The return line is located in the air space above the stored product and is connected to the blower intake. The size of the blower and the on-time of the drive motor are selected to provide a desired time period for one complete gaseous volume change. The recirculating system is usually separate from the aeration systems utilized in grain storage facilities for temperature and humidity control.

The combination of grain storage and the use of phosphine gas, however, can create dangerous conditions that must be avoided, such as undesired escape of the gas from the storage container, explosion or fire, and the corrosive effect of phosphine gas on metal and electrical components. Furthermore, operational flexibility of recirculating systems is important especially with the increased use of such systems in the holds of large grain ships, both as to installation within the cargo holds and operation to accommodate in-transit storage.

SUMMARY OF THE INVENTION

It is, therefore, the primary object of the present invention to provide a recirculating fumigation system utilized in storage facilities for agricultural products which cannot induce an electrical shock or cause an explosion or fire, is resistant to the corrosive effects of gaseous fumigants, and may be readily installed in the storage facility.

As a corollary to the foregoing object, it is an important aim of this invention to provide such a system having the capability of variable speed operation so that it may adapt to the resistance of a particular stored product to air flow, and provide a high-speed operational mode for degasation that is particularly advantageous in in-transit storage.

Another important object of the present invention is to provide a system as aforesaid in which the blower thereof is driven by a pneumatic motor supplied from a separate air source, thereby maintaining isolation from the fumigated air within the facility and precluding escape of the fumigant from the confines of the container structure.

Still another important object is to provide a blower for such a fumigation system which is chemically inert to the gaseous fumigant employed, thereby preventing corrosion of the system components and increasing the reliability and useful life of the system.

Yet another object of this invention is to provide such a fumigation system which is entirely nonelectrical through the exclusive use of a pneumatic motor as the drive means for the blower, with the additional advantage that the pneumatic motor drive provides nearly infinite selectability of blower speed to accommodate the air resistance of the stored product and adds a degasation mode as mentioned above.

Furthermore, it is an important object of the present invention to provide such a system that is particularly adapted for installation in the hold of a ship, either by permanent attachment to the access hatch of the ship hold or temporary installation within the hatch, in each case providing an entirely nonelectrical, corrosion-free, weatherproof system utilizing a pneumatic motor driven by a separate supply of air.

Other objects will become apparent as the detailed description proceeds.

DESCRIPTION OF THE DRAWINGS

FIG. 2. is a diagrammatic, horizontal crossection through the hatch or manway shown in FIG. 1 looking down on the components therein, the phantom lines illustrating an alternative mounting of the motor and blower.

FIG. 3 is an elevational view of an installed pneumatic motor assembly, as seen viewing the outside of the wall of the hatch on which the components are mounted.

FIG. 4 is an elevational view from the inside of the hatch showing the installed blower, parts being broken away to reveal the internal construction of the blower.

DETAILED DESCRIPTION

Figure 1:
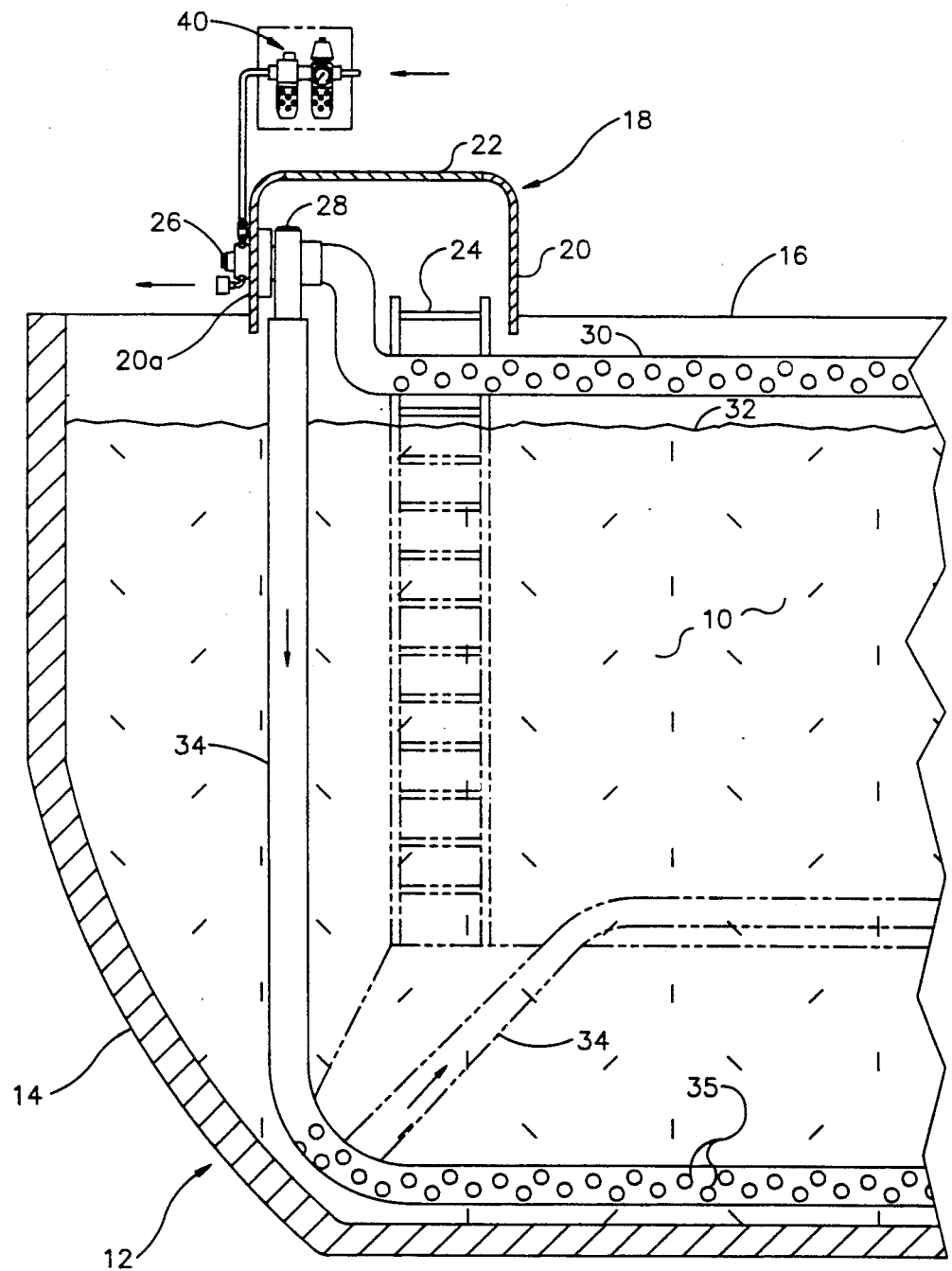
FIG. 1 is a diagrammatic, partial transverse crosssection through the hull of a ship showing a cargo hold in which the fumigation system of the present invention is installed, it being understood that the components of the system are illustrated on an enlarged scale for clarity as compared with the structure of the ship.

Referring initially to FIG. 1., the storage facility illustrated is a cargo hold 10 of a ship 12 having a hull 14 and a deck 16. For access to the hold 10, a hatch or manway 18 is provided having a coaming 20 and a cover 22. A ladder 24 extends downwardly from the hatch 18 to the bottom of the hold 10.

The primary components of the fumigation system of the present invention may be seen in FIG. 1 installed on the ship 12, including a pneumatic motor 26 mounted on the outside of the wall portion 20a of coaming 20 (FIGS. 2 and 3), a blower 28 mounted on the inside of wall 20a within the hatch 18, an intake line 30 extending horizontally in the air space in hold 10 above the top 32 of the stored product, and a discharge line 34 extending downwardly from the blower 28 to the bottom of the hold 10. The discharge line 34 extends throughout the bottom area of the hold and is perforated as illustrated at 35 in order to introduce the air/gaseous fumigant mixture over the entire bottom portion of the stored product. The intake line 30 is likewise perforated to withdraw the mixture and direct it back to the blower 28 after it has passed upwardly through the product.

Referring to FIGS. 2-4, it may be seen that a supply line 36 from a source of pressurized air (not shown) is connected through a combination filter/regulator/oiler unit 40 to an inlet pipe 38 extending to the motor 26. The combination unit 40 is of a type typically provided for the operation of air motors and includes a filter 42 for removing contaminants from the compressed airflow, such as liquids (especially water), solid particles and oil vapor. A gauge 44 downstream therefrom shows the inlet pressure at the motor 26 as controlled by an air regulator having an internal valve (not shown) which is adjusted by rotating a knob 46 to set the pressure as indicated by the gauge 44. A downstream oiler 48 completes the unit 40 and adds necessary lubricant to the inlet air. The exhaust side of the motor 26 is provided with a muffler 50. (Note that in FIG. 1 the unit 40 is shown raised and rotated 90 degrees so that it may be seen.)

The motor 26 is suitably mounted on the coaming wall 20a and its output shaft 52 (FIG. 2) extends through an opening in wall 20a to the rotary fan element 54 of the blower 28, the latter being secured to the inside of wall 20a. The proximal end of the intake line 30 is connected to the intake 56 of the blower 28, and the upper end of the discharge line 34 is connected to the blower outlet 58. The blower is preferably composed of nonmetallic, non-corrosive materials which are chemically inert to phosphine and other fumigants, such as polycarbonate resin and alpha butylene styrene plastics. It should be understood that a suitable sealant is applied around the opening in wall 20a so that the hatch and cargo hold interior is maintained airtight.

The phantom lines in FIG. 2 illustrate an alternative arrangement of the present invention in which the motor and blower components are installed in the manway on a temporary basis by securing the assembly to a rung of the ladder 24. Air hoses 60 and 62 extend from outside the hatch 18 to the assembly to supply air from the external pressure source and vent the motor exhaust outside the hatch. Hose 60 is connected to the inlet pipe 38 and hose 62 extends from the exhaust port of the motor 26 to locate the muffler 50 outside the hatch. Being of relatively small diameter, the hoses 60 and 62 may be inserted between the hatch cover 22 and the lip of the coaming 20 and a suitable seal temporarily applied to maintain an airtight condition during transit.

Figure 5:
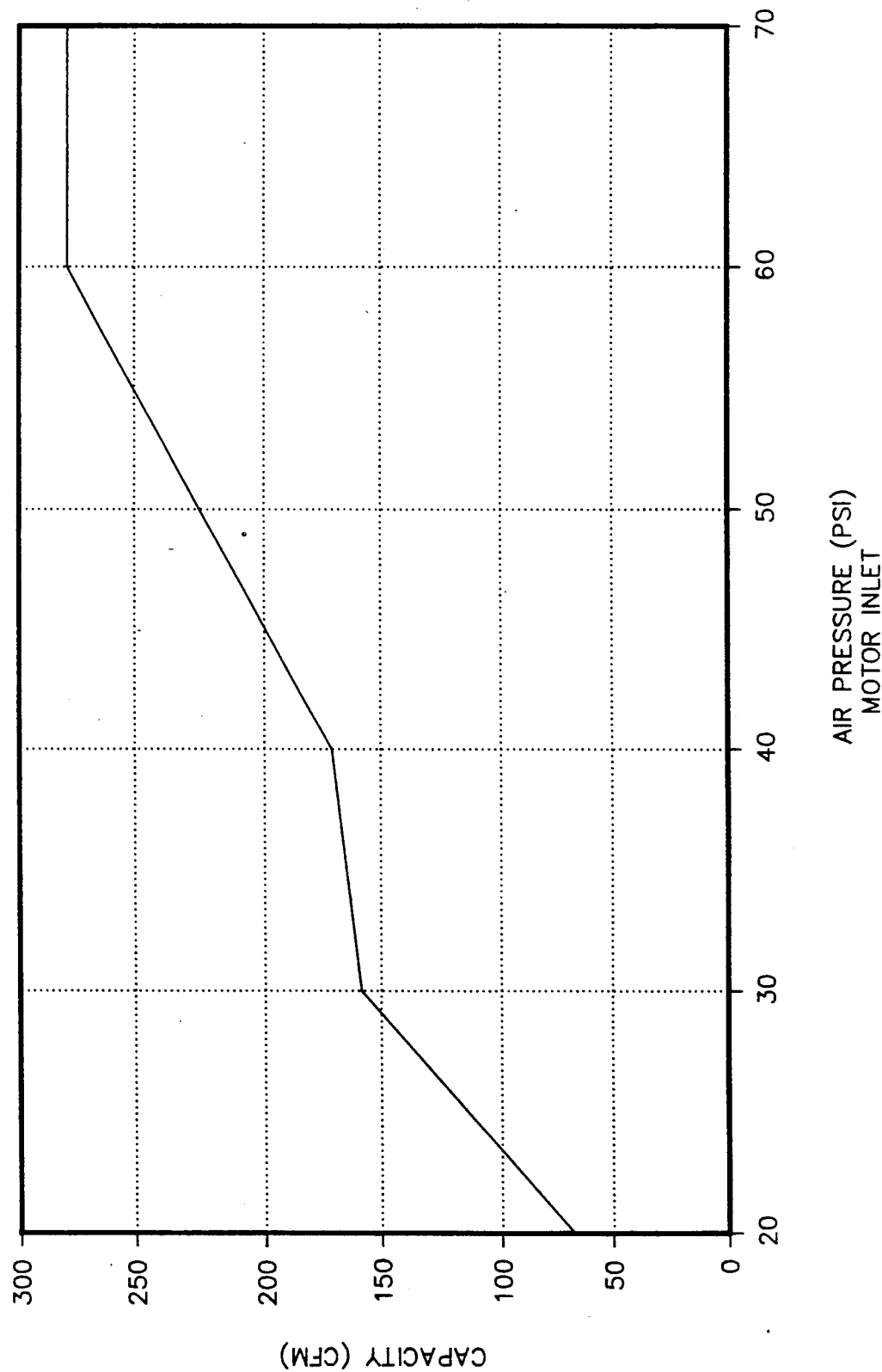
FIG. 5 is a graph illustrating the operational characteristics of the system and shows the capacity of the blower corresponding to the pressure of the air supply at the inlet of the pneumatic motor.

FIG. 5 is a representative graph illustrating the variable speed characteristics of the system. The graph reflects the flow capacity in cubic feet per minute (CFM) of a blower having a four-inch rotor, driven by an air motor of approximately three-fourths horsepower such as a model 2AM-NCW-7A manufactured by Gast Manufacturing Corporation, Benton Harbor, Michigan, U.S.A. The pressure in pounds per square inch (PSI) is at the motor inlet. As inlet pressure increases, the rpm of the motor output shaft 52 and the rotary fan 54 likewise increases, resulting in a continuous, generally increasing blower capacity over the inlet pressure range. Therefore, by adjustment of the knob 46 on the inlet valve, the blower capacity may be precisely set as desired for the particular product through which the gaseous fumigant is being recirculated. For example, the larger grain size of wheat or corn may require a lower fan speed, such as 20 PSI at the motor inlet, whereas the greater resistance to airflow of a product such as soy bean meal could require additional blower speed corresponding to 30 PSI. In this manner, the speed of the blower fan may be precisely selected within a wide range of recirculation speeds to accommodate the flow resistance of a particular stored product. Particularly when phosphine gas is the fumigant, it is desired to limit the flow rate to provide a time period for one gaseous volume change of approximately four to five days in order to maximize the effectiveness of the phosphine pesticide.

Additionally, the ability to control the air motor speed provides the system of the present invention with the capability to assist in degasation of the storage facility, a particularly important feature in ship hold storage as it is often desired to rapidly degas the hold at the end of a voyage. This is readily accomplished by opening the inlet valve to increase the inlet pressure which in the illustrated graph raises the blower capacity to over 250 CFM to provide a high flow rate. The hatch cover 22 is opened and the intake line 30 is disconnected from the blower intake 56, permitting fresh outside air to be introduced to the stored product via discharge line 34. Accordingly, the blower speed may be selected as desired within the recirculation range to accommodate the resistance of the stored product, and then increased to a much higher speed after fumigation is completed to purge the fumigant from the hold.

It should also be understood that the system of the present invention is equally applicable to fixed storage facilities such as grain elevators, installation being simplified by the entire storage structure being above ground. Typically, the motor/blower assembly would be located near ground level as appropriate, the discharge line laid in the base of the storage bin, and the intake line to the blower extended upwardly to the top of the bin and then inwardly over the stored product.

Having thus described the invention what is claimed as new and desired to be secured by Letters Patent is as follows:

1. In a storage facility for agricultural products having a product-receiving container, a fumigation system comprising:
   intake line means for receiving a gaseous fumigant present in said container,
   blower means having an intake connected with said intake line means, a discharge outlet, and rotary fan means in communication with said intake and outlet,
   discharge line means connected with said outlet for delivering said gaseous fumigant to said container at a discharge region spaced from said intake line means,
   a pneumatic motor having inlet means, an exhaust, and an output shaft connected with said fan means for driving the latter to circulate said fumigant through a product stored in said container, and
   a pneumatic supply line connected to said inlet means for supplying said motor from a pressure source outside said container.

2. The fumigation system as claimed in claim 1, wherein said rotary fan means is composed of a material which is chemically inert to said gaseous fumigant.

3. The fumigation system as claimed in claim 1, wherein said inlet means includes selectively operable control means for permitting the speed of said fan means to be selected within a range of recirculation speeds in accordance with the flow resistance of a stored product.

4. The fumigation system as claimed in claim 3, wherein said control means is operable to increase the speed of said fan means above said recirculation range to facilitate degasation of said container.

5. The fumigation system as claimed in claim 4, wherein said control means includes valve means for controlling the pressure from said source applied to said motor.

6. In a ship having a cargo hold for receiving an agricultural product, the hold being provided with an access hatch having a wall, a fumigation system comprising:
   intake line means in an upper portion of said hold for receiving a gaseous fumigant present therein,
   blower means in said hatch mounted on said wall and having an intake connected with said intake line means, a discharge outlet, and rotary fan means in communication with said intake and outlet,
   discharge line means in a lower portion of said hold and connected with said outlet for delivering said gaseous fumigant at a discharge region spaced from said intake line means,
   a pneumatic motor outside said hatch mounted on said wall and having inlet means, an exhaust, and an output shaft extending through said wall and connected with said fan means for driving the latter to circulate said fumigant through a product contained in said hold, and
   a pneumatic supply line connected to said inlet means for supplying said motor from a pressure source outside said hold.

7. The fumigation system as claimed in claim 6, wherein said rotary fan means is composed of a material which is chemically inert to said gaseous fumigant.

8. In a ship having a cargo hold for receiving an agricultural product, the hold being provided with an access hatch, a fumigation system comprising:
   intake line means in an upper portion of said hold for receiving a gaseous fumigant present therein,
   blower means in said hatch having an intake connected with said intake line means, a discharge outlet, and rotary fan means in communication with said intake and outlet,
   discharge line means in a lower portion of said hold and connected with said outlet for delivering said gaseous fumigant at a discharge region spaced from said intake line means,
   a pneumatic motor in said hatch having inlet means, an exhaust, and an output shaft connected with said fan means for driving the latter to circulate said fumigant through a product contained in said hold, and
   pneumatic supply and exhaust lines extending from outside said hold to said inlet means and exhaust of said motor respectively, said supply line being adapted for communication with a pressure source outside said hold.

9. The fumigation system as claimed in claim 8, wherein said rotary fan means is composed of a material which is chemically inert to said gaseous fumigant.

* * * * *